United States Patent Office 2,997,498
Patented Aug. 22, 1961

2,997,498
SCHIFF BASE CARBAMATES
Alexander T. Shulgin, Berkeley, Calif., assignor to The Dow Chemical Company, Midland, Mich., a corporation of Delaware
No Drawing. Filed Apr. 11, 1960, Ser. No. 21,079
3 Claims. (Cl. 260—479)

This invention is concerned with polynuclear aromatic Schiff base carbamate esters particularly those having the formula

The compounds of the present invention are crystalline solids, soluble in many organic solvents such as benzene, toluene, xylene, methylene chloride and carbon tetrachloride, and substantially insoluble in water.

The products of the present invention are useful as parasiticides and are particularly adapted to be employed for the control of insects. The compounds are also useful for the control of bacteria and fungi, as well as other terrestrial and aquatic pests.

The compounds of the present invention may be prepared by (1) the reaction of benzaldehyde with an aminonaphthol, to produce an intermediate Schiff base naphthol

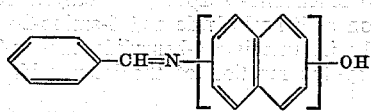

followed by (2) the reaction of the latter with methyl isocyanate, $CH_3NCO$.

The first step of the reaction may be carried out by reacting substantially equimolar proportions of benzaldehyde with an aminonaphthol or its hydrochloride salt although an excess of either component may be employed. The reaction is usually carried out in the presence of a solvent or liquid reaction medium. Suitable solvents for use as reaction medium include water, alcohol, water-alcohol mixture, benzene and toluene. The reaction takes place over a period of from about 5 minutes to 24 hours in the temperature range of from about 15° to 100° C. with the formation of the desired Schiff base naphthol intermediate. The preferred conditions for carrying out the preparation of the Schiff base naphthol intermediate depends in part on whether the aminonaphthol compound is employed as a free base or as its hydrochloride salt.

In one method of carrying out this step, the benzaldehyde is added to the aminonaphthol in sufficient hot (about 100 C.) dilute aqueous mineral acid to maintain the amine in solution as its mineral acid salt. The preferred mineral acid is hydrochloric acid. After completion of the addition of the aldehyde and after insuring complete dispersion of the added aldehyde by agitation any insoluble impurity is removed by filtration. A base is then added to the hot mixture or filtrate to react with the mineral acid present. The preferred base is sodium acetate. The sodium acetate may be added as a solid or as an aqueous solution. The mixture is then cooled to room temperature or below (0° C. to 20° C.) and allowed to stand for a period of from 0.25 to 24 hours. As a result of these operations, a reaction takes place and the Schiff base naphthol intermediate precipitates in the reaction mixture as a solid or an oil. The Schiff base naphthol intermediate may then be recovered from the reaction mixture by conventional procedures such as filtration, decantation, vaporization of the solvent and the like, and may thereafter be purified, if desired, by washing, decolorizing a solution thereof with activated charcoal and/or by recrystallization. The crude product, if an oil, solidifies during the purification procedures.

In an alternative method for carrying out the first step, substantially equimolar proportions of benzaldehyde and aminonaphthol are mixed together in an organic solvent and the resulting mixture heated at reflux temperature for from 0.25 to 1 hour to obtain the desired Schiff base naphthol intermediate and water of reaction. The water of reaction is removed from the mixture by codistilling with the organic solvent and the Schiff base naphthol intermediate recovered as residue. The latter may be purified, if desired, by conventional procedures as previously set forth.

In the second step of the reaction, a substantially equimolar proportion or a slight excess of methyl isocyanate is reacted with a Schiff base naphthol intermediate prepared as above described at a temperature of from 20° to 35° C. for a period of from 2 to 48 hours. The reaction is preferably carried out in the presence of a catalyst. Suitable catalysts include triethylamine, trimethylamine and pyridine. The reaction is preferably carried out in the presence of a solvent. Suitable solvents include methylene chloride, pentane and hexane. Alternatively, the reaction may be carried out in excess triethylamine, trimethylamine or pyridine, said bases functioning both as a catalyst and as a solvent. As a result of these operations, the desired Schiff base carbamate product is formed. The latter precipitates in the reaction but may remain in solution if solvent is employed. The product may be recovered by filtration or as residue by evaporating or distilling off the solvent. The product may then be purified by washing or decolorizing with activated charcoal and if solid, by recrystallization from a suitable solvent such as methylene chloride, pentane, hexane, isooctane or mixtures thereof.

In a preferred method for carrying out the reaction, benzaldehyde is added to a hot aqueous hydrochloric acid solution of the appropriate aminonaphthol. The amount of hydrochloric acid employed is sufficient to form a salt with the amine compound. After completion of the addition, an amount of sodium acetate sufficient to react with the hydrochloride is added to the reaction mixture in one portion with vigorous shaking. A reaction takes place with the formation of the desired Schiff base naphthol intermediate which precipitates when the mixture is allowed to stand for from about 15 minutes to 1 hour. The intermediate is recovered and thereafter purified, if desired, by conventional procedures.

The Schiff base naphthol intermediate thus prepared is mixed with methyl isocyanate in methylene chloride solvent and a few drops of triethylamine catalyst added thereto. The resulting mixture is allowed to stand at 20° to 30° C. for from 2 to 12 hours whereupon a reaction takes place with the formation of the desired Schiff base carbamate product. The latter may be recovered by filtration or by vaporizing off the solvent and thereafter purified, if desired, by conventional procedures.

The following examples illustrate the present invention but are not to be construed as limiting.

Example 1.—1-benzylideneamino-2-naphthyl methylcarbamate

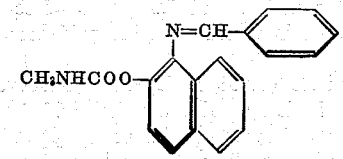

5.3 grams (0.050 mole) of benzaldehyde was added to a solution of 9.8 grams (0.050 mole) of 1-amino-2-naphthol hydrochloride in 150 milliliters of boiling water. The mixture which immediately became yellow was intimately mixed by shaking and a solution of 7.5 grams of sodium acetate trihydrate in 25 milliliters of water added thereto. A reaction took place with the formation of an oil which crystallized on cooling to yield a 1-benzylideneamino-2-naphthol intermediate. The latter was recovered by filtration and recrystallized from 75 milliliters of 95 percent ethanol to obtain 9.5 grams of bright yellow crystals having a melting point of 141°–144° C.

0.8 milliliter (0.014 mole) of methyl isocyanate and a few drops of triethylamine were added to room temperature to a solution of 3.0 grams (0.011 mole) of 1-benzylideneamino-2-naphthol in 20 milliliters of methylene chloride. A reaction took place with the formation of the desired 1-benzylideneamino-2-naphthyl methylcarbamate product which was obtained from the reaction mixture as a yellow crystalline solid by evaporation of the solvent. The product had a melting point of 121°–123° C.

*Example 2.—5-benzylideneamino-1-naphthyl methylcarbamate*

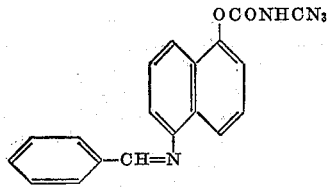

In a similar manner as previously described, 5.3 grams (0.050 mole) of benzaldehyde and a solution of 7.5 grams of sodium acetate-trihydrate in 25 milliliters of water were added in successive steps to a solution of 9.8 grams (0.050 mole) of 5-amino-1-naphthol·hydrochloride in 100 milliliters of boiling water to obtain an intermediate 5-benzylideneamino-1-naphthol as a greenish solid contaminated with a black oil. The crude intermediate was recovered by filtration and recrystallized from 50 milliliters of 95 percent ethanol to obtain a pale yellow-green micro-crystalline solid which melted at 164°–165° C.

0.3 milliliter (0.050 mole) of methyl isocyanate was added to a solution of 1.0 grams (0.0035 mole) of 5-benzylideneamino-1-naphthol intermediate above prepared in 30 milliliters of warm methylene chloride. A reaction took place with the formation of the desired 5-benzylideneamino-1-naphthyl methylcarbamate product which was recovered by evaporation of the solvent from the reaction mixture. The product was purified by recrystallization from a methylene chloride-pentane mixture to obtain a purified product as a purple-gray solid melting at 153°–155° C.

*Example 3.—4-benzylideneamino-1-naphthyl methylcarbamate*

In a similar manner, 5.3 grams (0.050 mole) of benzaldehyde is reacted with 9.8 grams (0.050 mole) 4-amino-1-naphthol·hydrochloride in boiling water followed by the addition of 7.5 grams of sodium acetate to produce an intermediate 4-benzylideneamino-1-naphthol.

3.0 milliliters (0.053 mole) methyl isocyanate and a few drops of triethylamine are then added to a solution of the intermediate 4-benzylidene-1-naphthol above prepared of the intermediate 4-benzylidene-1-naphthol above prepared in methylene chloride to obtain a 4-benzylideneamino-1-naphthyl methylcarbamate product having a molecular weight of 357.

*Example 4*

In a similar manner the following compounds are prepared:

2-benzylideneamino-1-naphthyl methylcarbamate by the reaction of benzaldehyde and 2-amino-1-naphthol to produce the intermediate 2-benzylideneamino-1-naphthol followed by the reaction of the latter with methyl isocyanate.

6-benzylideneamino-1-naphthyl methylcarbamate by the reaction of benzaldehyde and 6-amino-1-naphthol to produce the intermediate 6-benzylideneamino-1-naphthol followed by the reaction of the latter with methyl isocyanate.

8-benzylideneamino-1-naphthyl methylcarbamate by the reaction of benzaldehyde and 8-amino-1-naphthol to produce the intermediate 8-benzylideneamino-1-naphthol followed by the reaction of the latter with methyl isocyanate.

7-benzylideneamino-1-naphthyl methylcarbamate by the reaction of benzaldehyde and 7-amino-1-naphthol to produce the intermediate 7-benzylideneamino-1-naphthol followed by the reaction of the latter with methyl isocyanate.

5-benzylideneamino-2-naphthyl methylcarbamate by the reaction of benzaldehyde and 5-amino-2-naphthol to produce the intermediate 5-benzylideneamino-2-naphthol followed by the reaction of the latter with methyl isocyanate.

6-benzylideneamino-2-naphthyl methylcarbamate by the reaction of benzaldehyde and 6-amino-2-naphthol to produce the intermediate 6-benzylideneamino-2-naphthol followed by the reaction of the latter with methylisocyanate.

7-benzylideneamino-2-naphthyl methylcarbamate by the reaction of benzaldehyde and 7-amino-2-naphthol to produce the intermediate 7-benzylideneamino-2-naphthol followed by the reaction of the latter with methyl isocyanate.

8-benzylideneamino-2-naphthyl methylcarbamate by the reaction of benzaldehyde and 8-amino-2-naphthol to produce the intermediate 8-benzylideneamino-2-naphthol followed by the reaction of the latter with methyl isocyanate.

3-benzylideneamino-2-naphthyl methylcarbamate by the reaction of benzaldehyde and 3-amino-2-naphthol to produce the intermediate 3-benzylideneamino-2-naphthol followed by the reaction of the latter with methyl isocyanate.

4-benzylideneamino-2-naphthyl methylcarbamate by the reaction of benzaldehyde and 4-amino-2-naphthol to produce the intermediate 4-benzylideneamino-2-naphthol followed by the reaction of the latter with methyl isocyanate.

*Example 5.—5-benzylideneamino-2-naphthyl methylcarbamate*

5.3 grams (0.050 mole) of benzaldehyde and 8 grams (0.05 mole) of 5-amino-2-naphthol are mixed together in benzene and the resulting mixture heated at reflux temperature for about thirty minutes. The mixture is then distilled to remove the water of reaction as a benzene-water azeotrope, the benzene being replaced as it is distilled off. The remaining benzene is then distilled off to recover as residue a 5-benzylideneamino-2-naphthol intermediate.

3.2 milliliters (0.057 mole) of methyl isocyanate and a few drops of triethylamine are added at room temperature to a solution of the intermediate above prepared in about 20 milliliters of methylene chloride to obtain a 5-benzylidene-2-naphthyl methylcarbamate product having a molecular weight of 357.

The benzylideneaminonaphthyl methylcarbamates of the present invention are useful as parasiticides and are adapted to be employed for the control of insects, bacteria and fungi. In a representative operation for the control of insects, the benzylideneaminonaphthyl methylcarbamates are separately dispersed in water to prepare aqueous spray compositions containing 100 parts by weight of one of the carbamates per million parts of ultimate spray mixture. These compositions when separately applied to cranberry bean plants and the plants infested with Southern army worm larvae give good controls of the Southern army worm.

I claim:

1. A compound having the formula

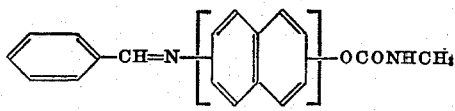

2. 1-benzylideneamino-2-naphthyl methylcarbamate.
3. 5-benzylideneamino-1-naphthyl methylcarbamate.

References Cited in the file of this patent

J.A.C.S., vol. 63 (1941), pp. 308–311.
Journal of Agricultural and Food Chemistry, vol. 2 (1954), pp. 864–70.

UNITED STATES PATENT OFFICE
CERTIFICATION OF CORRECTION

Patent No. 2,997,498                      August 22, 1961

Alexander T. Shulgin

It is hereby certified that error appears in the above numbered patent requiring correction and that the said Letters Patent should read as corrected below.

Column 3, the formula in Example 2, should read as shown below:

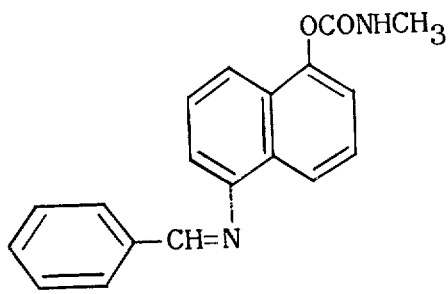

Column 3, lines 73 and 74, strike out "prepared of the intermediate 4-benzylidene-1-naphthol above".

Signed and sealed this 17th day of April 1962.

(SEAL)
Attest:

ESTON G. JOHNSON
Attesting Officer

DAVID L. LADD
Commissioner of Patents